(12) United States Patent
Zhang et al.

(10) Patent No.: US 7,410,006 B2
(45) Date of Patent: Aug. 12, 2008

(54) POWER TOOL ANTI-KICKBACK SYSTEM WITH ROTATIONAL RATE SENSOR

(75) Inventors: Qiang Zhang, Baltimore, MD (US); Uday Deshpande, Baltimore, MD (US); Shailesh P. Waikar, Cockeysville, MD (US); Daniel Puzio, Baltimore, MD (US); Craig Schell, Street, MD (US); William F. Hilsher, Parkville, MD (US); Joshua D. West, Towson, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/254,146

(22) Filed: Oct. 19, 2005

(65) Prior Publication Data

US 2006/0081386 A1    Apr. 20, 2006

Related U.S. Application Data

(60) Provisional application No. 60/675,692, filed on Apr. 28, 2005, provisional application No. 60/620,283, filed on Oct. 20, 2004.

(51) Int. Cl.
*E21B 15/04* (2006.01)
(52) U.S. Cl. .......................... 173/1; 173/176; 173/179
(58) Field of Classification Search .............. 173/1, 173/4, 5, 6, 11, 176, 178, 179, 161
See application file for complete search history.

(56) References Cited

U.S. PATENT DOCUMENTS

| 3,847,229 | A | 11/1974 | Wanner et al. |
|---|---|---|---|
| 4,066,133 | A | 1/1978 | Voss |
| 4,249,117 | A | 2/1981 | Leukhardt et al. |
| 4,267,914 | A | 5/1981 | Saar |
| 4,426,588 | A | 1/1984 | Weilnmann |
| 4,448,261 | A | 5/1984 | Kousek et al. |
| 4,573,556 | A | 3/1986 | Andreasson |
| 4,628,233 | A | 12/1986 | Bradus |
| 4,638,870 | A | 1/1987 | Kousek |
| RE33,379 | E | 10/1990 | Bradus |
| 5,036,925 | A | 8/1991 | Wache |
| 5,201,373 | A | 4/1993 | Bloechle |
| 5,284,217 | A | 2/1994 | Eshghy |

(Continued)

FOREIGN PATENT DOCUMENTS

EP    0 018 603 A    11/1980

(Continued)

*Primary Examiner*—Brian D. Nash
(74) *Attorney, Agent, or Firm*—Harness, Dickey & Pierce, P.L.C.

(57) ABSTRACT

A control system is provided for use in a power tool. The control system includes: a rotational rate sensor having a resonating mass and a controller electrically connected to the rotational rate sensor. The rotational rate sensor detects lateral displacement of the resonating mass and generates a signal indicative of the detected lateral displacement, such that the lateral displacement is directly proportional to a rotational speed at which the power tool rotates about an axis of the rotary shaft. Based on the generated signal, the controller initiates a protective operation to avoid further undesirable rotation of the power tool. The control scheme employed by the power tool may initiate different protective operations for different tool conditions.

14 Claims, 6 Drawing Sheets

U.S. PATENT DOCUMENTS

| | | | |
|---|---|---|---|
| 5,401,124 A | 3/1995 | Hettich | |
| 5,535,306 A | 7/1996 | Stevens | |
| 5,563,482 A * | 10/1996 | Shaw et al. | 318/272 |
| 5,584,619 A | 12/1996 | Guzzela | |
| 5,615,130 A | 3/1997 | Bolan et al. | |
| 5,637,968 A * | 6/1997 | Kainec et al. | 318/432 |
| 5,704,435 A | 1/1998 | Meyer | |
| 5,738,177 A * | 4/1998 | Schell et al. | 173/178 |
| 5,754,019 A | 5/1998 | Walz | |
| 5,879,111 A | 3/1999 | Stock et al. | |
| 5,914,882 A | 6/1999 | Yeghiazarians | |
| 5,954,457 A | 9/1999 | Stock et al. | |
| 5,984,020 A | 11/1999 | Meyer et al. | |
| 5,996,707 A | 12/1999 | Thome et al. | |
| 6,044,918 A | 4/2000 | Noser et al. | |
| 6,111,515 A | 8/2000 | Schaer et al. | |
| 6,408,252 B1 | 6/2002 | DeSmet | |
| 6,415,875 B1 | 7/2002 | Mexner et al. | |
| 6,479,958 B1 | 11/2002 | Thompson et al. | |
| 6,836,614 B2 * | 12/2004 | Gilmore | 388/811 |
| 7,121,358 B2 * | 10/2006 | Gass et al. | 173/2 |
| 2001/0042630 A1 | 11/2001 | Kristen et al. | |
| 2003/0116332 A1 | 6/2003 | Nadig et al. | |
| 2004/0182175 A1 | 9/2004 | Day et al. | |
| 2004/0211573 A1 | 10/2004 | Carrier et al. | |
| 2004/0226424 A1 * | 11/2004 | O'Banion et al. | 83/397 |
| 2005/0217874 A1 * | 10/2005 | Forster et al. | 173/1 |
| 2006/0081386 A1 * | 4/2006 | Zhang et al. | 173/2 |

FOREIGN PATENT DOCUMENTS

| | | |
|---|---|---|
| EP | 1 524 084 A | 4/2005 |
| GB | 2 086277 | 9/1981 |
| WO | WO 88/65508 | 9/1988 |

* cited by examiner

POWER TOOL ANTI-KICKBACK SYSTEM WITH ROTATIONAL RATE SENSOR

CROSS-REFERENCE TO RELATED APPLICATIONS

This application claims the benefit of U.S. Provisional Application No. 60/620,283, filed on Oct. 20, 2004 and U.S. Provisional Application No. 60/675,692 filed on Apr. 28, 2005. The disclosure of the above applications are incorporated herein by reference.

FIELD OF THE INVENTION

The present invention relates generally to a safety mechanism for power tools and, more particularly, to a control system having a rotational rate sensor for detecting the onset of kickback condition in a power tool.

BACKGROUND OF THE INVENTION

Power tools typically employ a motor that imparts torque to a tool through a spindle. In the case of an electric drill, the motor spindle is coupled through a series of reducing gears to the chuck, which in turn holds the drill bit or other cutting/abrading tool, such as a hole saw, a grinding wheel or the like. Power screwdrivers as well a large rotary hammers work on a similar principle. In each of these cases, the function of the reducing gears or gear train is to reduce the rotational speed of the tool while increasing the rotational torque.

Power routers are somewhat different. The cutting tool of the hand-held router is typically direct coupled to the spindle of the motor. In this case, the full rotational speed of the motor is used without gear reduction to rotate the router bit at high speed. Reciprocating saw and jigsaws use yet another type of gear train that translates the rotational motion of the motor spindle to reciprocating movement.

Generally speaking, all of these power tools may suddenly encounter an impending kickback condition at which time the output torque rapidly rises because of local changes in workpiece hardness, workpiece binding, tool obstruction from burrs and so forth. For example, when drilling a hole with a power drill, some workpieces will develop burrs on the tool exit side of the workpiece. These burrs can engage the flutes of the drill bit, thereby causing a rapid increase in torque as the drill tries to break free. In some instances, the burrs may stop drill bit rotation, thereby causing a strong reaction torque that is imparted to the tool operator as the motor turns the tool in the operator's grasp (rather than turning the drill bit). This reaction is can be problematic if the operator is standing on a ladder and/or holding the tool over their head. A related phenomenon also occurs with power saws. These conditions are hereinafter generally referred to as kickback conditions, regardless of the particular power tool involved or the specific circumstance which give rise to the condition.

Therefore, it is desirable to provide an improved technique for detecting the onset of such kickback conditions in power tools.

SUMMARY OF THE INVENTION

In one aspect of the present invention, a control system is provided for use in a power tool. The control system includes: an rotational rate sensor having a resonating mass and a controller electrically connected to the rotational rate sensor. The rotational rate sensor detects lateral displacement of the resonating mass and generates a signal indicative of the detected lateral displacement, such that lateral displacement is directly proportional to a rotational speed at which the power tool rotates about an axis of the rotary shaft. Based on the generated signal, the controller initiates a protective operation to avoid undesirable rotation of the power tool.

In another aspect of the present invention, the control scheme employed by the power tool may initiate different protective operations for different tool conditions.

In different aspect of the present invention, the control scheme may initiate a protective operations based on input from two different sensors.

In yet another aspect of the present invention, the control scheme employed by the power tool may initiate protective operations based on the rotational energy experienced by the tool.

For a more complete understanding of the invention, its objects and advantages, reference may be made to the following specification and to the accompanying drawings.

DETAILED DESCRIPTION OF THE PREFERRED EMBODIMENTS

Figure 1:
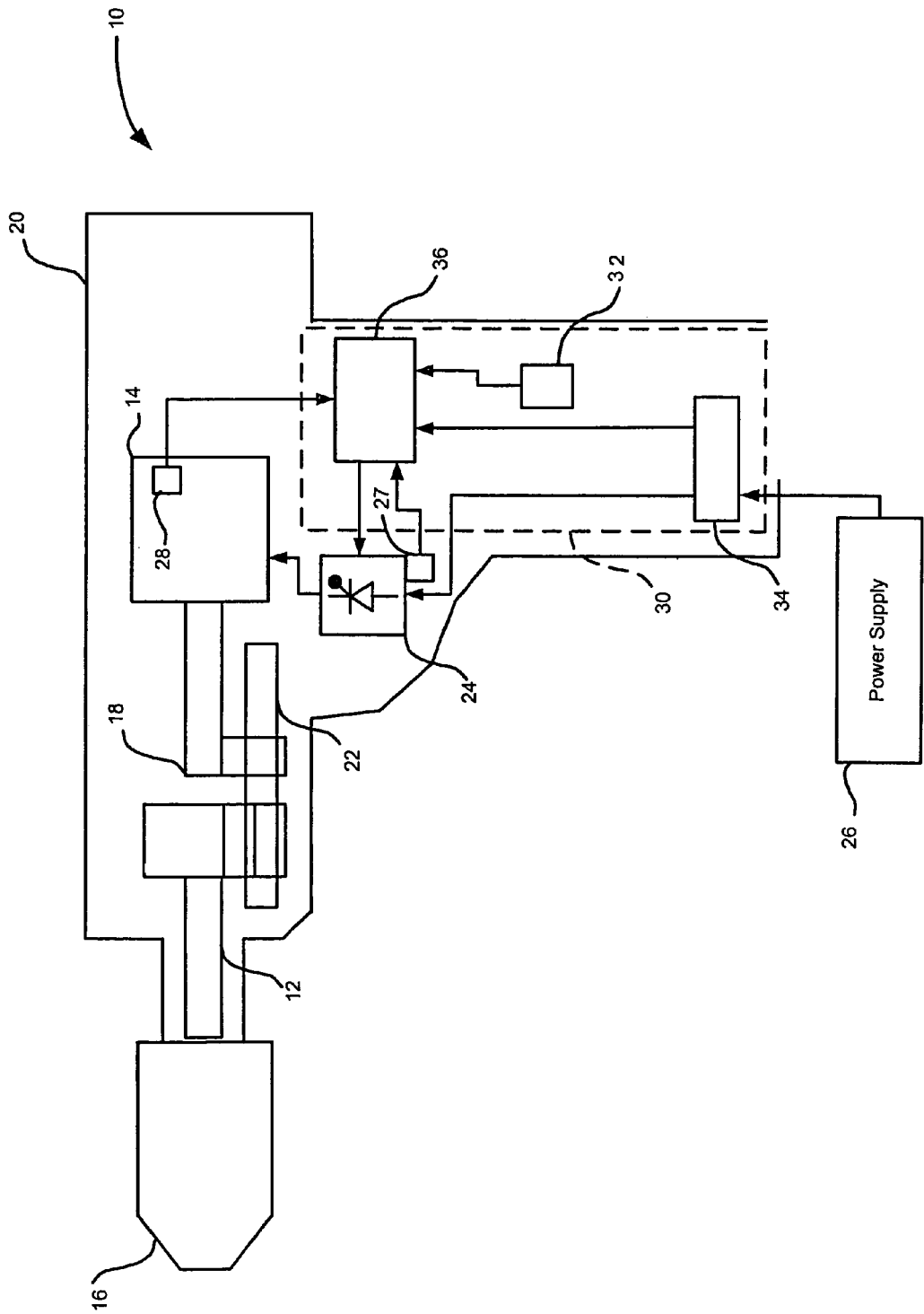
FIG. 1 is a longitudinal sectional view of an exemplary rotary hammer configured in accordance with the present invention.

FIG. 1 illustrates an exemplary power tool 10 having a rotary shaft. In this example, the power tool is a hand held rotary hammer. While the following description is provided with reference to a rotary hammer, it is readily understood that the broader aspects of the present invention are applicable to other types of power tools having rotary shafts, such as drills.

In general, the rotary hammer includes a spindle 12 (i.e., a rotary shaft) drivably coupled to an electric motor 14. A chuck 16 is coupled at one end of the spindle 12; whereas a drive shaft 18 of the electric motor 14 is connected via a transmission 22 to the other end of the spindle 12. These components are enclosed within a housing 18. Operation of the tool is controlled through the use an operator actuated switch 24 embedded in the handle of the tool. The switch regulates current flow from a power supply 26 to the motor 14. The power tool may further include a temperature sensor 27. Although a few primary components of the rotary hammer are discussed above, it is readily understood that other components known in the art may be needed to construct an operational rotary hammer.

In accordance with the present invention, the power tool 10 is further configured with a control system 30 to detect a kickback condition. The control system 30 may include a rotational rate sensor 32, a current sensor 34, and a microcontroller 36 embedded in the handle of the power tool 10. In some instances, the onset of a kickback condition will cause the power tool 10 to rotate in the operator's grasp. The rotational rate sensor 32 detects any such rotational motion.

In a preferred embodiment, the operating principle of the rotational rate sensor 32 is based on the Coriolis effect. Briefly, the rotational rate sensor is comprised of a resonating mass. When the power tool is subject to rotational motion about the axis of the spindle, the resonating mass will be laterally displaced in accordance with the Coriolis effect, such that the lateral displacement is directly proportional to the angular rate. It is noteworthy that the resonating motion of the mass and the lateral movement of the mass occur in a plane which is orientated perpendicular to the rotational axis of the rotary shaft. Capacitive sensing elements are then used to detect the lateral displacement and generate an applicable signal indicative of the lateral displacement. An exemplary rotational rate sensor is the ADXRS150 or ADXRS300 gyroscope device commercially available from Analog Devices.

The microcontroller 36 then determines the onset of a kickback condition based on the signal received from the rotational rate sensor 32. For instance, an indication of a kickback condition may be when the signal level from the rotational rate sensor exceeds some empirically derived threshold. When this occurs, the microcontroller 36 will initiate a protective operation intended to avoid and/or minimize any undesired rotation of the power tool. It is readily understood that other techniques for assessing the signal received from the rotational sensor are within the scope of the present invention.

Figure 2:
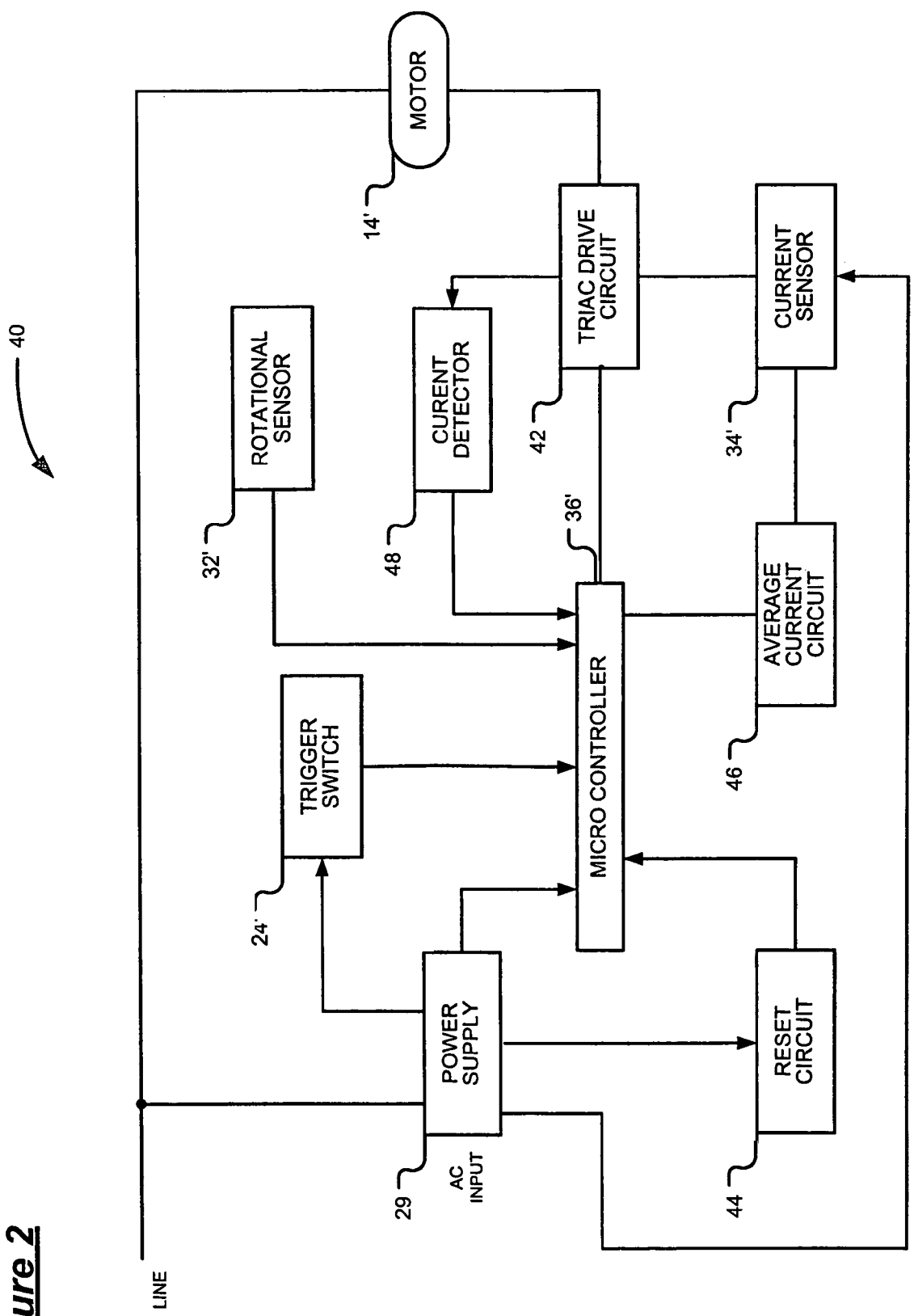
FIG. 2 is simplified block diagram of an exemplary control system in accordance with present invention.

Operation of an exemplary control circuit 40 is further described below in relation to FIG. 2. A power supply circuit 29 is coupled to an AC power line input and supplies DC voltage to operate the microcontroller 36'. The trigger switch 24' supplies a trigger signal to the microcontroller 36'. This trigger signal indicates the position or setting of the trigger switch 24' as it is manually operated by the power tool operator. Drive current for operating the motor 14' is controlled by a triac drive circuit 42. The triac drive circuit 42 is, in turn, controlled by a signal supplied by microcontroller 36'. If desired, the control system 30' may include a reset circuit 44 which, when activates, causes the microcontroller 36' to be re-initialized.

A current sensor 34' is connected in series with the triac drive circuit 42 and the motor 14'. In an exemplary embodiment, the current sensor 34' may be a low resistance, high wattage resistor. The voltage drop across the current sensor 34' is measured as an indication of actual instantaneous motor current. The instantaneous motor current is supplied to an average current measuring circuit 46 which in turn supplies the average current value to the microcontroller 36'. The microcontroller 36' may use the average current to evaluate the onset of a kickback condition.

The microcontroller 36' is also supplied with a signal from a current detector circuit 48. The current detector circuit 48 is coupled to the triac drive circuit 42 and supplies a signal indicative of the conductive state of the triac drive circuit 42. If for some reason the triac drive circuit 42 does not turn on in response to the control signal from the microcontroller 36', this condition is detected by the current detector circuit 48.

In operation, the trigger switch 24' supplies a trigger signal that varies in proportion to the switch setting to the microcontroller 36'. Based on this trigger signal, the microcontroller 36' generates a control signal which causes the triac drive circuit 42 to conduct, thereby allowing the motor 14' to draw current. The current causes the motor 14' to turn, such that the current is approximately proportional to the motor torque. During operation, the current sensor 34' monitors the motor current and reports the same to the microcontroller 36'. Based on the current draw, the microcontroller 36' may determine and/or confirm the onset of a kickback condition as will be further described below.

Upon detecting the onset of a kickback condition, the microcontroller 36' may operate the motor 14' in a pulse mode. During pulse mode, the motor current is pulsed at a predetermined frequency with a predetermined on-time. In one exemplary embodiment, the series of current pulses is designed such that the operator may regain control of a twisting tool. Alternatively, the series of current pulses create torque pulses that may have a peak torque that is greater than the average torque delivered by the spindle 12. In this way, the torque pulses may allow the tool 10 to break through the burrs or workpiece restrictions that are causing the impending kickback condition. Further details regarding this protection operation may be found in U.S. Pat. No. 6,479,958 which is incorporated herein by reference.

Pulse mode is an exemplary protective operation which may be initiated upon detecting a kickback condition. Other exemplary protective operations may include (but are not limited to) disconnecting power to the motor 14' braking the spindle 12, braking the motor 14', disengaging the motor 14' from the spindle 12 and reducing slip torque of a clutch disposed between the motor 14' and the spindle 12. Depending on the size and orientation of the tool 10, one or more of these protective operations may be initiated to prevent undesirable rotation of the tool 10.

Figure 3:
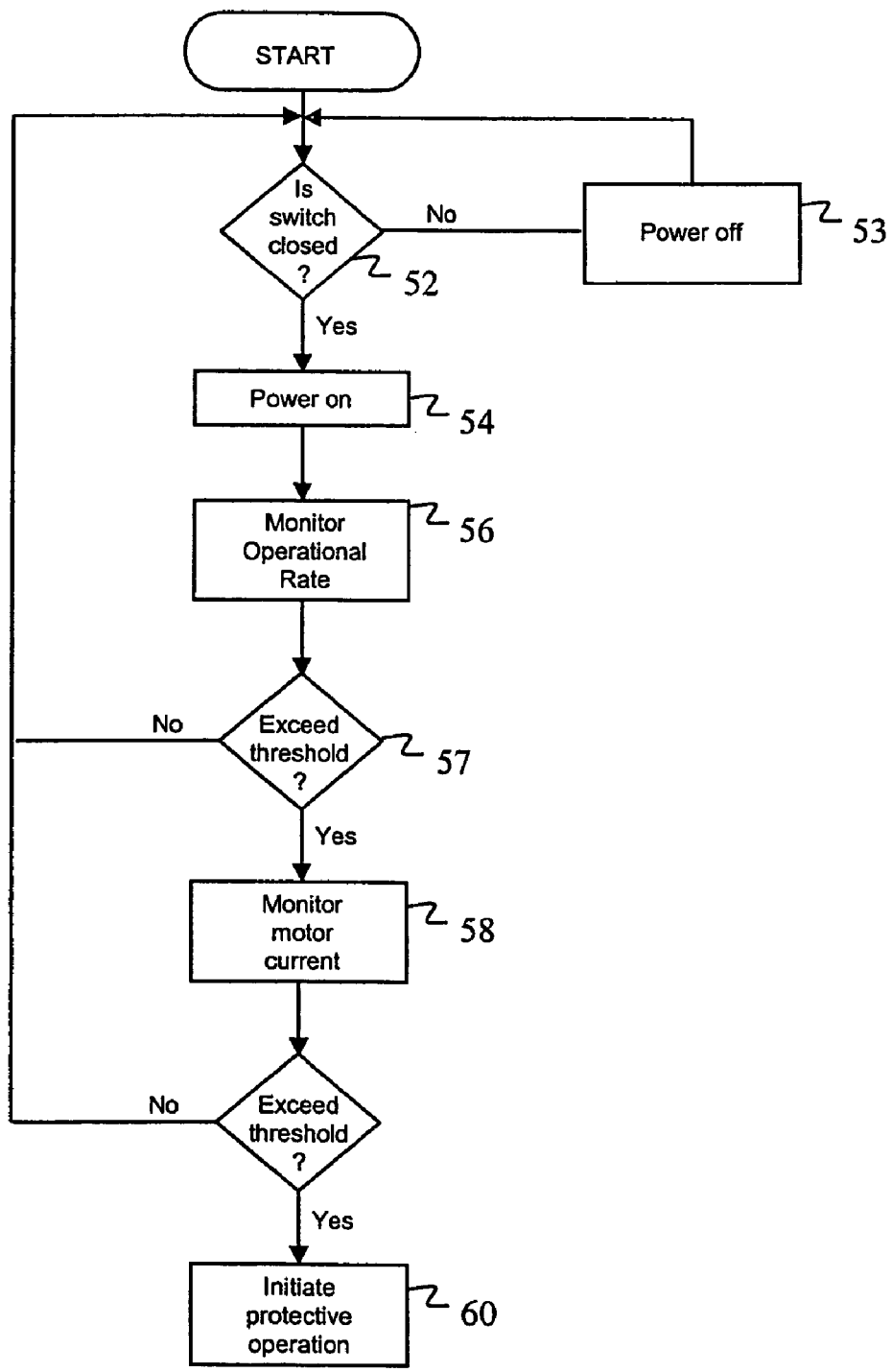
FIG. 3 is a flowchart illustrating an exemplary method for determining the onset of a kickback condition according to the present invention.

An exemplary method for determining the onset of a kickback condition is illustrated in FIG. 3. First, the operator switch is checked at step 52 to determine if the tool is operating. If the switch is not closed, then power is not being supplied to the motor as indicated at 53. In this case, there is no need to monitor for kickback conditions. Conversely, if the switch is closed, then power is being supplied to the motor as indicated at 54.

During tool operation, rotational motion of the tool is monitored at 56 based on the signal from the rotational rate sensor. When the rotational rate of the tool exceeds some empirically derived threshold (as shown at 57), this may indicate the onset of kickback condition; otherwise, processing control returns to the beginning of the algorithm. In addition to rotational rate of the tool about its spindle axis, it is envisioned that the rotational displacement, rotational acceleration, or some combination thereof as derived from the sensor signal may be used to determine the onset of a kickback condition.

Prior to initiating some protective operation, the microcontroller also evaluates the current draw of the motor at 58. Specifically, the rate of change of the motor current is measured. When the rate of change is positive and exceeds some predetermined threshold, then one or more protective operations are initiated at 60. If either the rate of change is not positive or the rate of change does not exceeds the threshold, then processing control returns to the beginning of the algorithm. In this case, a sudden change in the current draw is optionally used to confirm the onset of the kickback condition. It is envisioned that inputs from other sensors, such as a temperature sensor, may be used in a similar manner.

In another aspect of the present invention, the control scheme employed by the power tool 10 may initiate different protective operations for different tool conditions. For example, the amount of angular displacement experienced by the tool may dictate different protective operations. When angular displacement is within a first range (e.g., less than 31°), the operator is presumed to have control of the tool and thus no protective operations are needed. When the angular displacement exceeds this first range, it may be presumed that the tool has encountered a kickback condition and therefore some protective operation may be needed. In this second range of angular displacement (e.g., between 30° to 90°), the control scheme may initiate a pulse mode in hope of breaking through the restrictions that are causing the impending kickback condition. In contrast, when the angular displacement exceeds the second range (e.g., greater than 90°), it may be presumed that the operator has lost control of the tool. In this instance, a different protective operation may be initiated by the control scheme, such as disconnecting the power to the motor.

Depending on the complexity of the control scheme, three or more ranges of displacement may be defined for a given power tool. Within a range, protective operations may be initiated based on the angular displacement or a combination of parameters, such as angular acceleration, angular velocity, motor current, rate of change of motor current, motor temperature, switch temperature, etc. It is readily understood that the number and size of the ranges may vary for different control schemes and/or different types of tools. It is also envisioned that different protective operations may be initiated based on ranges of other parameters (e.g., ranges of angular velocity). Likewise, one or more protective operations may be associated with different ranges (i.e., tool conditions).

Figure 4A:
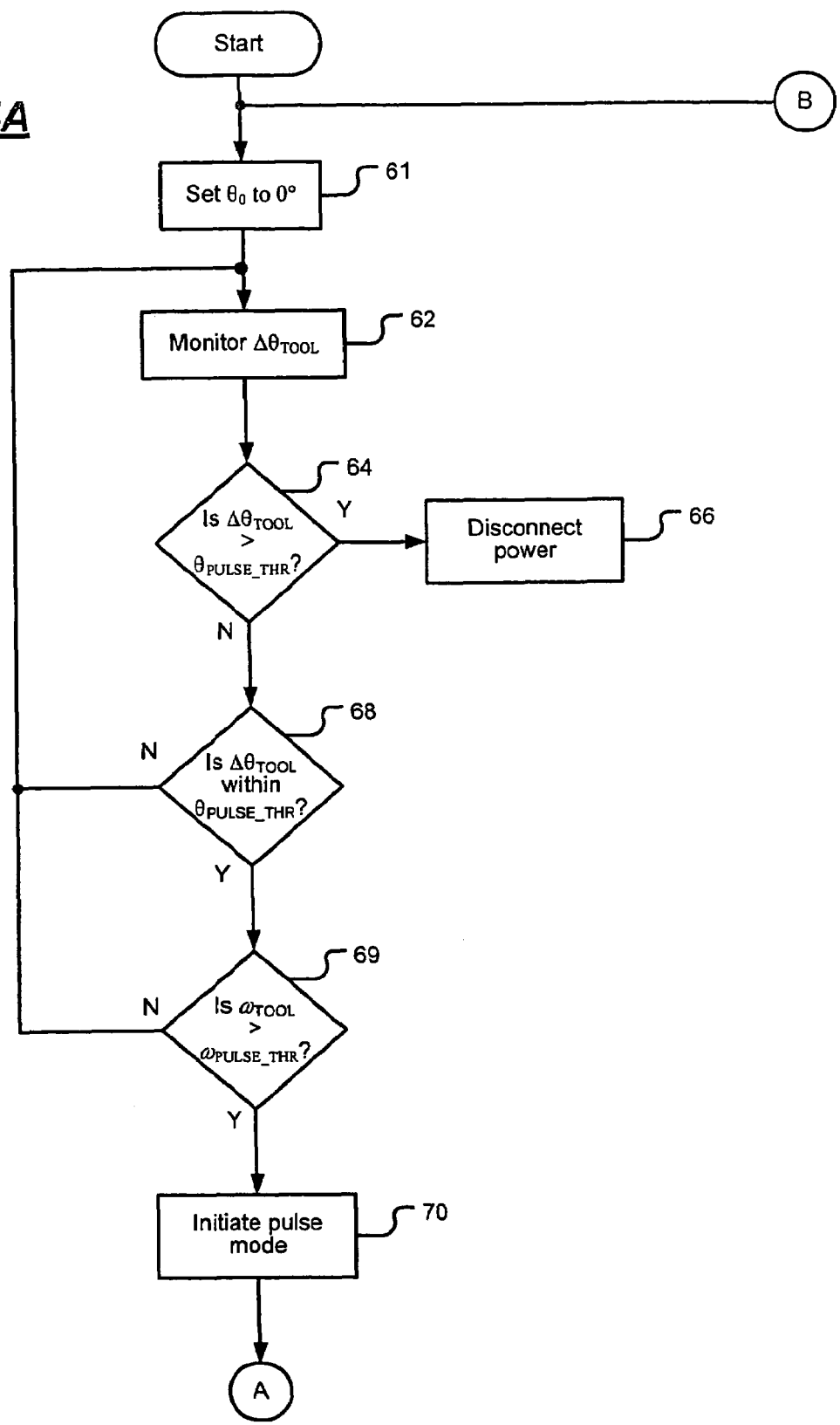
FIGS. 4A and 4B are flowcharts illustrating an exemplary method for determining a kickback condition based on angular displacement according to the present invention.
Figure 4B:
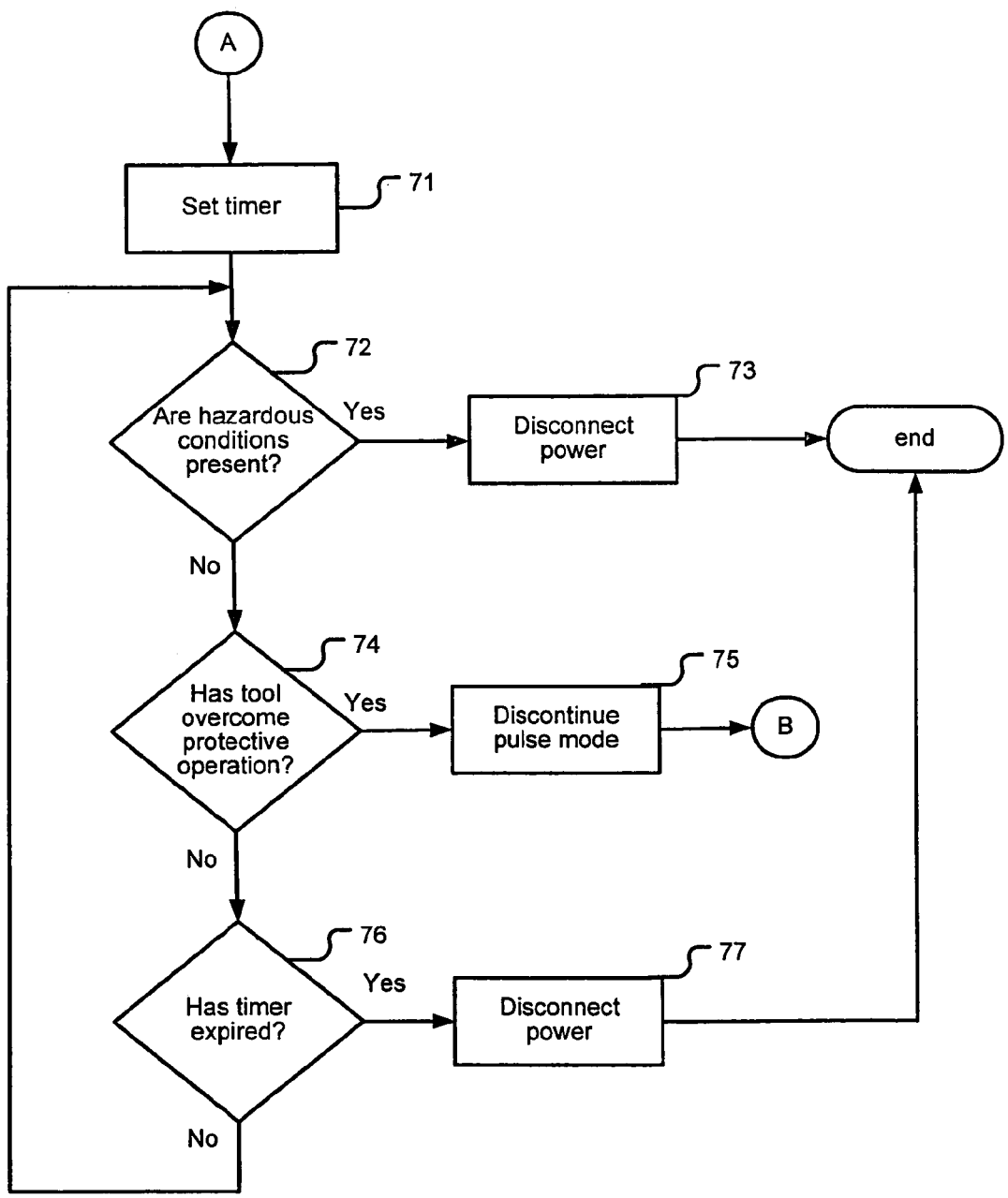

An exemplary method for determining the onset of a kickback condition based on an angular displacement of the power tool is further described below in relation to FIGS. 4A and 4B. During tool operation, angular displacement is monitored in relation to a start point ($\theta_0$). In step 61, this starting point is initialized to zero. Any subsequent angular displacement of the tool is then measured in relation to this reference.

Angular displacement of the tool is then monitored at step 62. In this exemplary embodiment, the angular displacement is measured in relation to the reference value ($\theta_0$) and derived from the rate of angular displacement over time or angular velocity ($\omega_{TOOL}$) as provided by a rotational rate sensor. While the rotational rate sensor described above is presently preferred for determining angular displacement of the tool, it is readily understood that this additional aspect of the present invention is not limited to this type of sensor. On the contrary, angular displacement may be derived from a different type of rotational rate sensor, an acceleration sensor or some other manner for detecting rotational displacement of the tool.

Different protective operations may be initiated based on the amount of angular displacement as noted above. Angular displacement is assessed at steps 64 and 68. When the angular displacement exceeds some upper threshold ($\theta_{zone2\_min}$), then a first protective operation is initiated at step 66. In this example, power to the motor is disconnected, thereby terminating operation of the tool.

When the angular displacement exceeds some lower threshold ($\theta_{zone1\_min}$), then a different protective operation, such as pulsing the motor current, may be initiated at 70. In this exemplary embodiment, an instantaneous measure of angular velocity must also exceed some minimum threshold before a pulse mode is initiated as shown at step 69. If neither of these criteria are met, no protective actions are taken and operating conditions of tool continue to be monitored by the control scheme.

During pulse mode, the control scheme continues to monitor tool operating conditions. Hazardous conditions may be monitored as shown at step 72. For instance, to prevent motor burn up, motor current may be monitored. If the motor current spikes above some predefined threshold, then power to the motor is disconnected at 73. To protect the tool operator, angular displacement may also be monitored. If angular displacement exceeds a threshold indicative of lost control, then the power to the motor is also disconnected. It is readily understood that other types of hazardous conditions may be monitored.

In addition, pulse mode is only maintained for a brief period of time. A timer is initiated at step 71 and pulse mode continues until the timer has expired as shown at 76. During this time, the control scheme may also monitor if the restrictions that caused the kickback condition have been overcome as shown at step 74. If the restrictions are overcome, then pulse mode is discontinued at step 75. When the timer expires without overcoming the restrictions, then power to the motor is disconnected as shown at 77.

Figure 5:
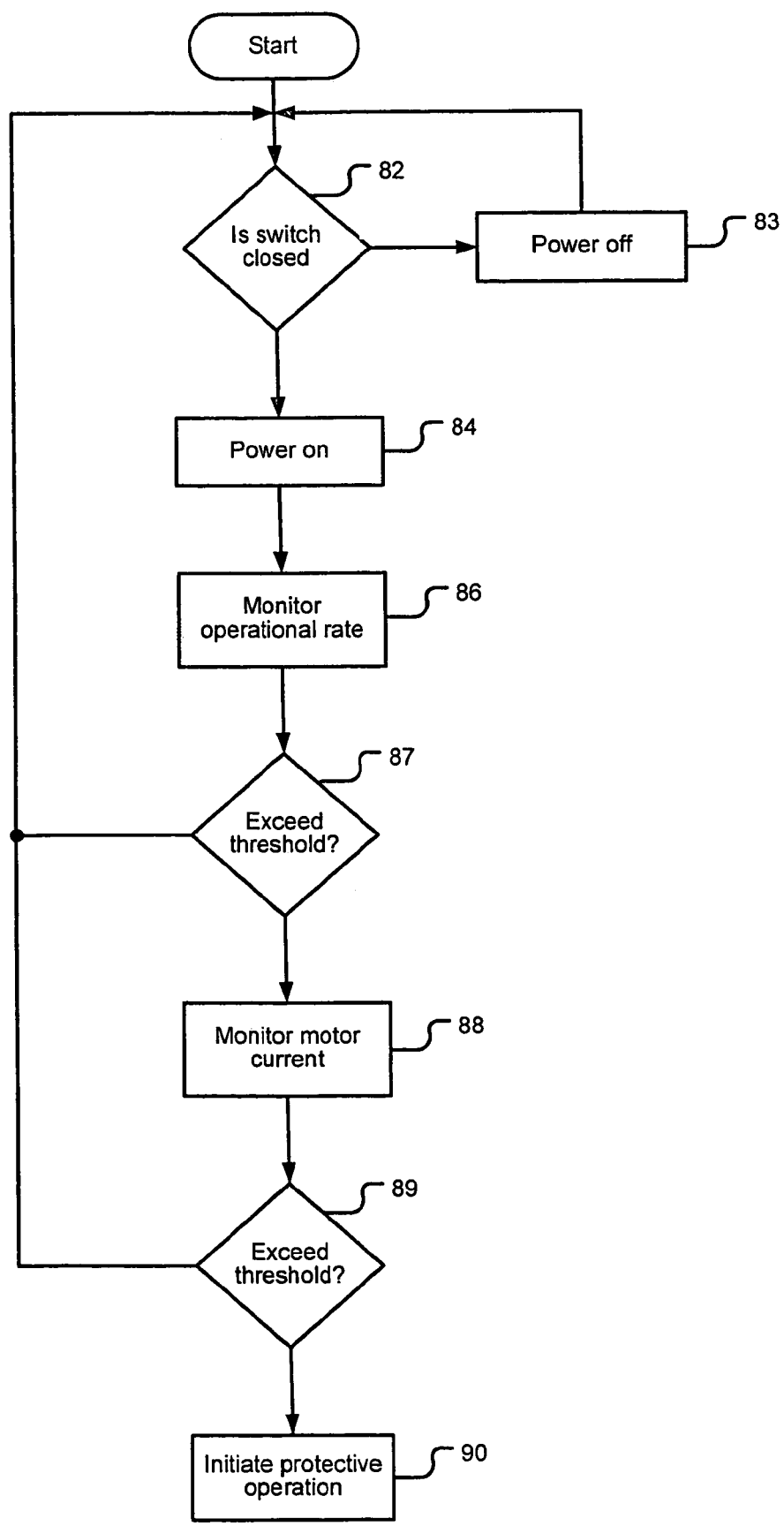
FIG. 5 is a flowchart illustrating an exemplary method for determining a kickback condition based input from two different sensors according to the present invention.

An exemplary method for determining the onset of a kickback condition based on input from at least two sensors is further described below in relation to FIG. 5. First, the operator switch is checked at step 82 to determine if the tool is operating. If the switch is not closed, then power is not being supplied to the motor as indicated at 83. In this case, there is no need to monitor for kickback conditions. Conversely, if the switch is closed, then power is being supplied to the motor as indicated at 84.

During tool operation, rotational motion of the tool is monitored at 86 based on the signal from the rotational rate sensor. When the rotational rate of the tool exceeds some empirically derived threshold (as shown at 87), this may indicate the onset of kickback condition; otherwise, processing control returns to the beginning of the algorithm. In addition to rotational rate of the tool about its spindle axis, it is envisioned that the rotational displacement, rotational acceleration, or some combination thereof as derived from the sensor signal may be used to determine the onset of a kickback condition.

Prior to initiating some protective operation, the microcontroller also evaluates the current draw of the motor at 88. Specifically, the rate of change of the motor current is measured. When the rate of change is positive and exceeds some predetermined threshold, then one or more protective operations are initiated at 90. If either the rate of change is not positive or the rate of change does not exceeds the threshold, then processing control returns to the beginning of the algorithm. In this case, a sudden change in the current draw is used to confirm the onset of the kickback condition. While the above description was provided with reference to a rotational rate sensor and a current sensor, it is readily understood that the broader aspects of the present invention encompass making such a determination may be based on input from other types of sensors.

Determination of a kickback condition may be based on other types of criteria. For example, a kickback condition may be assessed based on the rotational energy experienced by the power tool. In this example, rotational energy is defined as $E_{\omega\_TOOL} = (I)(\omega_{TOOL})^2$, where I is the moment of inertia and $\omega_{TOOL}$ is the angular velocity. For this computation, the rate of angular displacement could be measured by a rotational rate sensor; whereas, the moment of inertia of the tool ($I_{TOOL}$) could be preprogrammed into the controller based on the mass properties of the power tool (e.g., mass, rotation inertia and a center of gravity position) and a distance measure between the center of gravity position and the spindle axis. Initiating a protective operation based on $E_{\omega\_TOOL}$ is desirable because the energy condition is not tool specific and therefore could be applied to a variety of anti-kickback applications. Other criteria for determining a kickback condition are also within the broader aspects of the present invention.

While the invention has been described in its presently preferred form, it will be understood that the invention is capable of modification without departing from the spirit of the invention as set forth in the appended claims.

What is claimed is:

1. A method for initiating a protective response in a power tool having a rotary shaft and a rotary motion sensor, comprising:
    arranging the rotational motion sensor at a location in the power tool spatially separated from the rotary shaft and proximate to where a user grasps the tool;
    monitoring rotational motion of the rotational motion sensor about a longitudinal axis of the rotary shaft using the rotational motion sensor disposed in the power tool;
    determining rotational motion of the rotational motion sensor with respect to the longitudinal axis of the rotary shaft using a controller disposed in the power tool and based on input from the rotational motion sensor;
    initiating a first protective operation based on the rotational motion determined by the controller; and
    initiating a second protective operation based on the rotational motion determined by the controller, where the first protective operation is different than the second protective operation.

2. The control scheme of claim 1 wherein monitoring rotational motion further comprises using a rotational motion sensor that measures rotational velocity based on Coriolis acceleration.

3. The control scheme of claim 1 wherein determining rotational motion of the tool further comprises determining an angular displacement of the power tool about the axis of the rotary shaft.

4. The control scheme of claim 3 further comprises pulsing a motor of the power tool when the angular displacement exceeds a first threshold and disconnecting power to the motor when the angular displacement exceeds a second threshold which is greater than the first threshold.

5. The control scheme of claim 1 wherein determining rotational motion of the tool further comprises determining an angular velocity of the power tool about the axis of the rotary shaft.

6. The control scheme of claim 5 further comprises pulsing a motor of the power tool when the angular velocity exceeds a first threshold and disconnecting power to the motor when the angular velocity exceeds a second threshold which is greater than the first threshold.

7. The control scheme of claim 1 wherein the protective operation is selected from the group consisting of pulsing a motor of the power tool, braking the rotary shaft, braking the motor, disengaging the motor from the rotary shaft, and reducing slip torque of a clutch disposed between the motor and the rotary shaft.

8. The control scheme of claim 1 further comprises determining an angular velocity of the power tool about the axis of the rotary shaft.

9. The control scheme of claim 8 further comprises pulsing a motor of the power tool when the angular velocity exceeds a first velocity threshold and disconnecting power to the motor when the angular velocity exceeds a second velocity threshold which is greater than the first threshold.

10. A method for initiating a protective response in a power tool having a rotary shaft, comprising:
    monitoring rotational motion of the power tool about a longitudinal axis of the rotary shaft;
    determining an angular displacement of the power tool about the axis of the rotary shaft;
    initiating a first protective operation when the angular displacement exceeds a first threshold; and
    initiating a second protective operation when the angular displacement exceeds a second threshold which is greater than the first threshold, where the first protective operation is different than the second protective operation.

11. The control scheme of claim 10 wherein monitoring rotational motion further comprises using a rotational motion sensor that measures rotational velocity based on Coriolis acceleration.

12. The control scheme of claim 10 further comprises pulsing a motor of the power tool when the angular displacement exceeds a first threshold.

13. The control scheme of claim 10 further comprises disconnecting power to the motor when the angular displacement exceeds a second threshold which is greater than the first threshold.

14. The control scheme of claim 10 wherein the protective operation is selected from the group consisting of pulsing a motor of the power tool, braking the rotary shaft, braking the motor, disengaging the motor from the rotary shaft, and reducing slip torque of a clutch disposed between the motor and the rotary shaft.

* * * * *